US007315336B2

(12) United States Patent
North et al.

(10) Patent No.: US 7,315,336 B2
(45) Date of Patent: Jan. 1, 2008

(54) STRESS SEAL FOR TOUCHSCREEN SYSTEMS

(75) Inventors: Kenneth North, San Carlos, CA (US); Jeffrey T. Haller, South San Francisco, CA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/870,837

(22) Filed: Jun. 16, 2004

(65) Prior Publication Data

US 2005/0280746 A1   Dec. 22, 2005

(51) Int. Cl.
*G02F 1/1333* (2006.01)
(52) U.S. Cl. ...................................................... 349/58
(58) Field of Classification Search .................. 349/58
See application file for complete search history.

(56) References Cited

U.S. PATENT DOCUMENTS

| | | | |
|---|---|---|---|
| 4,642,423 A | 2/1987 | Adler | 345/177 |
| 4,644,100 A | 2/1987 | Brenner et al. | 178/18.04 |
| 4,645,870 A | 2/1987 | Adler | 345/177 |
| 4,700,176 A | 10/1987 | Adler | 341/20 |
| 4,746,914 A | 5/1988 | Adler | 345/177 |
| 4,761,637 A | 8/1988 | Lucas et al. | 341/5 |
| 4,791,416 A | 12/1988 | Adler | 345/177 |
| 4,825,212 A | 4/1989 | Adler et al. | 345/177 |
| 4,859,996 A | 8/1989 | Adler et al. | 345/177 |
| 4,880,665 A | 11/1989 | Adler et al. | 427/126.3 |
| RE33,151 E | 1/1990 | Adler | 345/177 |
| 5,072,427 A | 12/1991 | Knowles | 367/118 |
| 5,162,618 A | 11/1992 | Knowles | 178/18.04 |
| 5,177,327 A | 1/1993 | Knowles | 178/18.04 |
| 5,243,148 A | 9/1993 | Knowles | 178/18.04 |
| 5,260,521 A | 11/1993 | Knowles et al. | 178/18.04 |
| 5,329,070 A | 7/1994 | Knowles | 178/18.04 |
| 5,332,238 A * | 7/1994 | Borucki | 277/654 |

(Continued)

FOREIGN PATENT DOCUMENTS

EP          07087024 A         8/1983

OTHER PUBLICATIONS

Search Report for International Application No. PCT/US2005/021269, mailed Jan. 1, 2006.

*Primary Examiner*—David Nelms
*Assistant Examiner*—Phu Vu

(57) ABSTRACT

A touchscreen system is provided that incorporates a simplified sealing system around the bezel. The touchscreen system includes a planar touchscreen coupled to a display device having a planar display surface, the touchscreen having a touch sensitive region on a touchscreen surface. A frame is positioned above the touchscreen. The frame includes a central opening that substantially provides an outer border for the touch sensitive region, a rigid portion comprising an outer periphery of the frame, a flexible resilient portion connected to the rigid portion, the flexible portion comprising an inner periphery of the frame, and a sealing portion interposed between the touchscreen surface and the flexible portion. The flexible portion of the frame is directed out of a plane defined by the rigid portion toward the touchscreen prior to bringing the frame into contact with the touchscreen. Upon installation into the touchscreen, the flexible portion is displaced such that flexible portion exerts pressure on the touchscreen through the sealing portion. The simplified sealing system around the bezel can be used with any type of display having a planar display surface or any type of touchscreen technology.

31 Claims, 7 Drawing Sheets

U.S. PATENT DOCUMENTS

| | | | |
|---|---|---|---|
| 5,573,077 A | 11/1996 | Knowles | 178/18.04 |
| 5,591,945 A | 1/1997 | Kent | 178/18.04 |
| 5,708,461 A | 1/1998 | Kent | 345/177 |
| 5,739,479 A | 4/1998 | Davis-Cannon et al. | 178/18.04 |
| 5,784,054 A * | 7/1998 | Armstrong et al. | 345/177 |
| 5,854,450 A | 12/1998 | Kent | 178/18.04 |
| 6,254,105 B1 | 7/2001 | Rinde et al. | 227/628 |
| 6,411,287 B1 | 6/2002 | Scharff et al. | 345/177 |
| 6,677,934 B1 * | 1/2004 | Blanchard | 345/175 |
| 2002/0149571 A1 * | 10/2002 | Roberts | 345/174 |
| 2003/0006971 A1 * | 1/2003 | Blanchard | 345/173 |

* cited by examiner

STRESS SEAL FOR TOUCHSCREEN SYSTEMS

BACKGROUND OF THE INVENTION

1. Field of the Invention

The present invention relates generally to touchscreens and touchscreen systems and, more particularly, to a touchscreen system having a sealing system.

2. Introduction to the Invention

Touchscreens are used in conjunction with a variety of display types, including cathode ray tubes (i.e., CRTs) and liquid crystal display screens (i.e., LCD screens), as a means of inputting information into a data processing system. When placed over a display or integrated into a display, the touchscreen allows a user to select a displayed icon or element by touching the screen in a location corresponding to the desired icon or element. Touchscreens have become commonplace in a variety of different applications including, for example, point-of-sale systems, information kiosks, automated teller machines (i.e., ATMs), data entry systems, gaming machines, ticketing machines, etc.

There are several types of touchscreens, including acoustic, resistive, capacitive, infrared, and force. An acoustic touchscreen has a touch-sensitive area on which the presence and location of a touch is sensed via the touch's effect on acoustic waves propagating across the touchscreen surface. A common type of acoustic touchscreen employs Rayleigh waves (a term which, as used herein, includes quasi-Rayleigh waves). Illustrative disclosures relating to Rayleigh wave touchscreens include Adler, U.S. Pat. Nos. 4,642,423; 4,645,870; 4,700,176; 4,746,914; 4,791,416; and Re 33,151; Adler et al., U.S. Pat. Nos. 4,825,212; 4,859,996; and 4,880,665; Brenner et al., U.S. Pat. No. 4,644,100; Davis-Cannon et al., U.S. Pat. No. 5,739,479; and Kent, U.S. Pat. Nos. 5,708,461 and 5,854,450. Acoustic touchscreens employing other types of acoustic waves such as Lamb or shear waves, or combinations of different types of acoustic waves (including combinations involving Rayleigh waves) are also known, illustrative disclosures including Kent, U.S. Pat. Nos. 5,591,945 and 5,854,450; Knowles, U.S. Pat. Nos. 5,072,427; 5,162,618; 5,177,327; 5,243,148; 5,329,070; and 5,573,077; and Knowles et al., U.S. Pat. No. 5,260,521. The documents cited in this paragraph are incorporated herein by reference.

Touchscreen applications may require that the touchscreen operate in an outdoor environment or in a relatively harsh indoor environment such as a factory or restaurant. Therefore the touchscreen may be subjected to rain, fog, wind, dust, cleaning solutions, sprays, liquid spills, etc. As a consequence of these conditions, typically some form of seal is required between the touchscreen and the system enclosure. Generally, however, it is difficult to achieve a satisfactory seal in an acoustic touchscreen due to the touch detection mechanism, e.g., surface propagating acoustic waves, as the seal may absorb an excessive amount of the acoustic energy, thereby compromising touchscreen performance. As a general rule, the acoustic loss attributable to the sealing system should be less than 6 dB.

U.S. Pat. No. 5,332,238 discloses a sealing system using a resilient, compressible foam strip that is substantially transmissive to surface acoustic wave energy. An acceptable level of attenuation is achieved by placing an open-cell surface against the touchscreen surface or by restricting seal contact to a corner of the foam strip. The foam strip also includes at least one membrane surface extending between the touchscreen and the housing that is impermeable to liquids. A structure for maintaining the foam strip in position is also disclosed.

An alternate sealing system is disclosed in U.S. Pat. No. 5,784,054. As disclosed, the seal is formed of a closed cell foam in which the touchscreen contacting surface is covered with a liquid impervious barrier. Alternatively, the seal may be formed of an expanded polymer such as expanded polytetrafluoroethylene. In at least one embodiment of the disclosed system, the seal is used in a CRT-based monitor without requiring replacement or modification of the normal housing or bezel.

U.S. Pat. No. 6,411,287, incorporated herein by reference, discloses a sealing system for use with touchscreens that includes a seal coupled to a frame. The system includes tension elements to provide uniform compressive force per unit length along the perimeter of the seal.

What is needed in the art is a simplified seal for a touchscreen system which can provide a uniform compressive force along the perimeter of the seal and which can be used with a variety of display devices, especially those having flat display surfaces, e.g., CRT displays and LCDs, and a variety of touchscreen technologies, including acoustic, infrared, resistive, and capacitive. The present invention provides such a sealing system and touchscreen systems having such a sealing system.

BRIEF SUMMARY OF THE INVENTION

The present invention provides a touchscreen system having a seal around the perimeter of a touch sensitive area of the touchscreen. The touchscreen system can incorporate any type of planar touchscreen, including acoustic, infrared, capacitive, and resistive. In addition, the touchscreen system can incorporate any type of planar display device (i.e., display devices having a planar display surface), including CRT displays, LCDs, electroluminescent displays, and plasma displays.

Therefore, in a first aspect, this invention provides a touchscreen system comprising a planar touchscreen coupled to a display device having a planar display surface, the touchscreen having a touch sensitive region on a planar touchscreen surface. A frame is positioned above the touchscreen. The frame includes a central opening that substantially provides an outer border for the touch sensitive region, a rigid portion comprising an outer periphery of the frame, a flexible portion connected to the rigid portion, the flexible portion comprising an inner periphery of the frame, and a sealing portion interposed between the touchscreen surface and the flexible portion. The flexible portion of the frame is directed out of a plane defined by a top surface of the rigid portion toward the touchscreen prior to bringing the frame into contact with the touchscreen, and is displaced after installation of the frame into the touchscreen system such that flexible portion exerts pressure on the touchscreen through the sealing portion.

In a second aspect, this invention provides a method for assembling a touchscreen system, comprising providing a planar touchscreen having a touch sensitive region on a planar touchscreen surface and coupling the touchscreen to a display device having a planar display surface. The method includes providing a frame including a central opening, a rigid portion comprising an outer periphery of the frame, a flexible portion comprising an inner periphery of the frame and being connected to the rigid portion, and a sealing portion disposed on an inner periphery of the flexible portion. The flexible portion of the frame is directed out of a plane defined by a top surface of the rigid portion prior to assembly. The frame is positioned above the touchscreen such that the flexible portion is directed toward the touchscreen and the opening substantially provides an outer border for the touch sensitive region. The frame is installed into the touchscreen system such that the sealing portion contacts the touchscreen surface and the flexible portion is displaced upon installation such that it exerts pressure on the touchscreen through the sealing portion of the frame.

In a third aspect, this invention provides a frame for use in sealing a touchscreen system having a touchscreen with a planar exterior surface, the frame being positioned above the exterior surface and comprising a central opening that is substantially centered around a touch sensitive region on the exterior surface, a rigid portion comprising an outer periphery of the frame, a flexible portion connected to the rigid portion, the flexible portion comprising an inner periphery of the frame, and a sealing portion interposed between the surface and the flexible portion. The rigid portion of the frame has a top surface defining a first plane, and the flexible portion of the frame is directed out of the first plane toward the exterior surface prior to bringing the frame into contact with the exterior surface. The flexible portion is displaced after bringing the frame into contact with the exterior surface and installing the frame into the touchscreen system such that the flexible portion exerts pressure on the exterior surface through the sealing portion.

BRIEF DESCRIPTION OF THE DRAWINGS

The invention is illustrated by the following drawings.

DETAILED DESCRIPTION OF THE INVENTION

Figure 1:
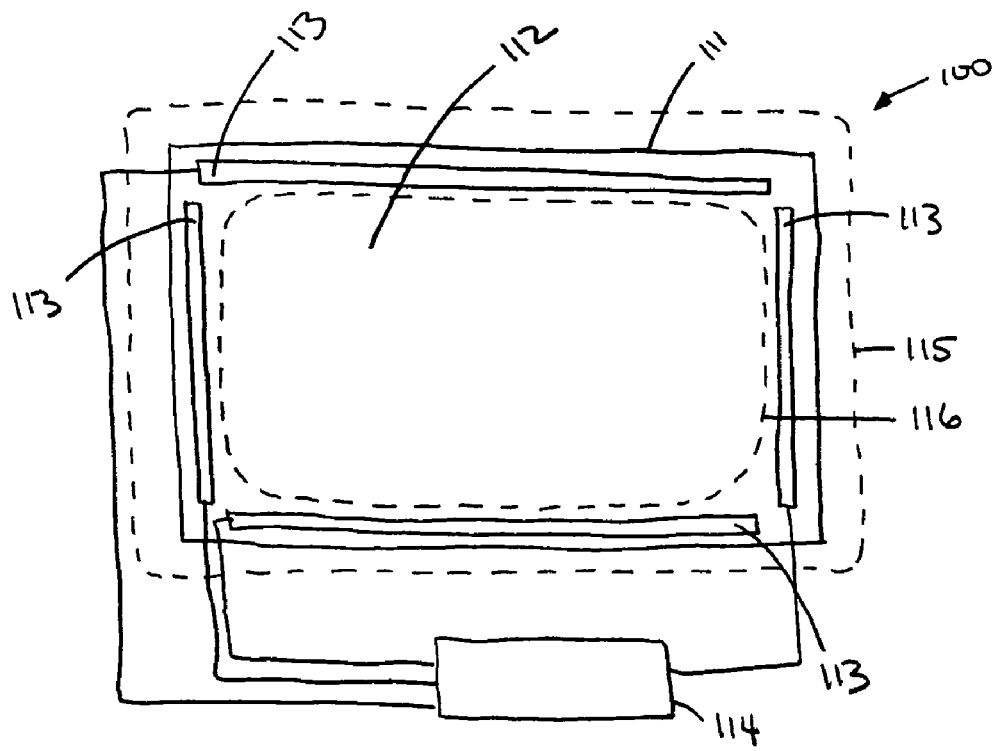
FIG. 1 is an illustration of a touchscreen system according to the prior art.

A touchscreen system is shown in FIG. 1, which can be applicable to any type of touchscreen technology, e.g., acoustic, resistive, capacitive or infrared. A touchscreen system 100 includes a touchscreen 111 coupled with a display device (not shown), e.g., a cathode ray tube (CRT) display, liquid crystal display (LCD), plasma display, electroluminescent display, or any suitable display. The touchscreen 111 includes a touch sensitive region 112, and touch sensing mechanisms 113. The touch sensing mechanisms 113 are located on a periphery of the touchscreen 111 to maximize the touch sensitive region 112. The touchscreen system 100 includes control electronics 114 which send and receive information from the touch sensing mechanisms 113. A housing 115 is provided for the touchscreen system 100, the housing including a frame or bezel 116 that covers and protects the touch sensing mechanisms 113. Touchscreen 111 can either be an overlay touchscreen, i.e., fabricated on a separate substrate (e.g., a glass substrate) that is mounted over a display panel or it can be a direct-on-tube touchscreen, i.e., fabricated directly onto the face of the display panel such that it is integral with the display (e.g., a CRT panel).

For acoustic touchscreens, touchscreen 111 has a surface that is suitable for propagating surface acoustic waves, e.g. Rayleigh waves, Love waves, and other acoustic waves sensitive to a touch on a the surface. Surface acoustic wave (i.e., SAW) touchscreens are disclosed in U.S. Pat. Nos. 4,644,100, 4,700,176, 5,708,461, 5,854,450, and Re. 33,151, the complete disclosures of which are incorporated herein by reference. The touch sensing mechanisms 113 include transmitting transducers, receiving transducers and reflective arrays. Touch sensing mechanisms for acoustic touchscreens have been described in detail previously, see for example U.S. Pat. No. 6,411,287, the disclosure of which is incorporated herein by reference.

For infrared touchscreens, the touch sensing mechanisms 113 include light emitters and light detectors. The light emitters are arranged and the infrared light is steered (e.g., using reflectors) to form an IR grid or pattern across the touch sensitive region 112. Touch sensing mechanisms for infrared touchscreens have been described in detail previously, see for example U.S. Pat. No. 4,761,637, the disclosure of which is incorporated herein by reference. In this case, bezel 116 that covers the touch sensing mechanisms 113 must be substantially transparent to the wavelength of light being used.

For resistive and capacitive touchscreens, the touch sensing mechanisms 113 include circuitry for measuring resistance, voltage or capacitance at various points around the perimeter of the touch sensitive region 112.

Figure 2:
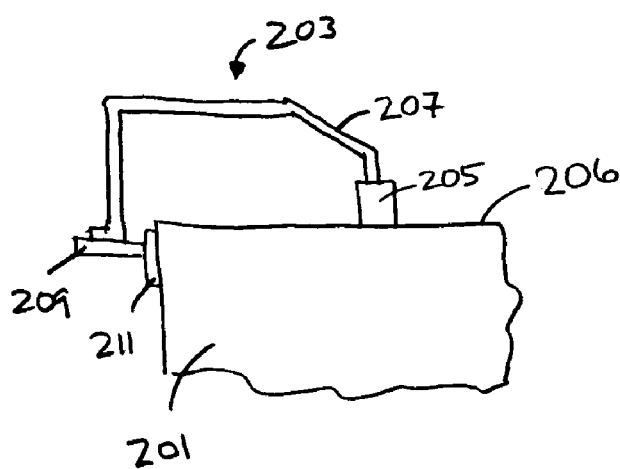
FIG. 2 is a cross-sectional view of a bezel assembly mounted to a display device of the prior art.

FIG. 2 is cross-sectional view of a portion of a bezel assembly attached to a display screen (e.g., CRT) 201 as can be used with or without a touchscreen system. As illustrated, display screen 201 does not include a touchscreen assembly. The bezel assembly is comprised of a resilient member 203, typically fabricated from molded plastic, that holds a seal 205 against the front surface 206 of CRT screen 201. Seal 205 is held against screen 201 by the pressure applied by a cantilever portion 207 of resilient member 203. Alternatively, seal 205 may be attached (e.g., bonded), temporarily or permanently, to both resilient member 203 and CRT screen 201. Seal 205 prevents contaminants from entering the CRT housing and potentially damaging the internally mounted components, e.g., CRT power supply or, in the case of a touchscreen system, the touchscreen components such as the touch sensing mechanisms 113 or control electronics 114. In a typical configuration, resilient member 203 is attached to display screen 201 by means of corner tabs 209 that are attached to the display via mounting site 211 (e.g., the implosion band for a CRT).

Figure 3:
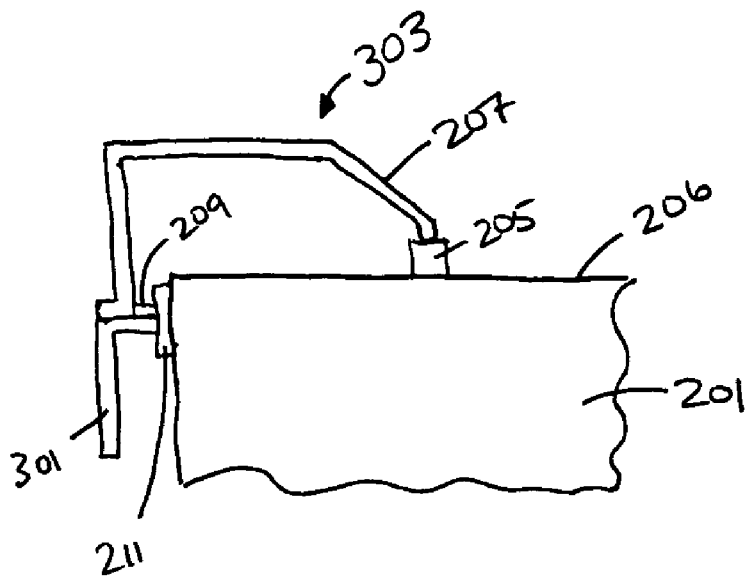
FIG. 3 is a cross-sectional view of a bezel assembly mounted to a housing for a display screen of the prior art.

FIG. 3 shows an alternate means of making a seal for a touchscreen system using the bezel. A bezel assembly 303 and tab 209 are attached to a housing assembly 301, for example using bolts, locking members, etc.

Figure 4:
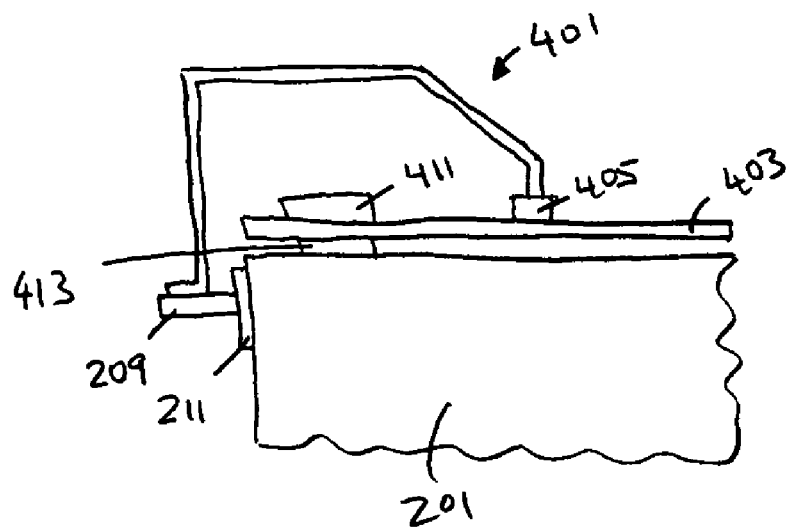
FIG. 4 is a cross-sectional view of a bezel assembly for a touchscreen system mounted to a display device of the prior art.

FIG. 4 is a cross-sectional view of a bezel assembly 401 attached to a display screen 201, the bezel mounting configuration being similar to that shown in FIG. 2. In the configuration illustrated in FIG. 4, a touchscreen overlay screen 403 is attached via hook and loop material, adhesives, or other means 413 to display screen 201. Touch sensing means 411 (e.g., acoustic reflective elements and transducers for an acoustic touchscreen) are located beneath bezel assembly 401 and behind sealing member 405. Therefore, for acoustic touchscreens, the acoustic absorption of member 405 must be minimized. It is understood that even if the components of the touchscreen system, e.g., transducers, reflective arrays, etc., are mounted directly to display surface 201 in a configuration similar to that shown in FIG. 2 (commonly referred to as a direct-on-tube acoustic touchscreen system), the acoustic absorption of the sealing member must still be minimized.

Although the acoustic absorption of the sealing member must be minimized, as noted in the example configuration shown in FIG. 4, this design restriction can be in conflict with the objective of maximizing sealing performance. For example, a silicon rubber seal can provide a robust seal, but may absorb too much acoustic signal to be used with a typical acoustic touchscreen system. Conversely, a lightweight, open cell foam under light compression can have minimal impact on the acoustic signal, but may provide limited sealing performance.

One approach to sealing an acoustic touchscreen is to use a relatively narrow seal, approximately 1 millimeter or less in width. Due to the narrow width of such a seal, a variety of sealing materials can exhibit acceptable levels of acoustic absorption, including those fabricated from solid rubbers. It is well known, however, that a seal is not mechanically stable unless it is wider than it is tall. Thus for a 1 millimeter wide seal, the height must be less than 1 millimeter, and preferably much less than 1 millimeter. As a consequence of these requirements, i.e., a seal less than 1 millimeter in width and a height much less than the width, the design constraints placed upon the bezel assembly and the display housing can be quite demanding.

Another approach to sealing touchscreens has been to use tensioning bands as described in U.S. Pat. No. 6,411,287, the disclosure of which has already been incorporated herein by reference. However, while tensioning bands can work well for curved surfaces (e.g., a curved CRT), such seals can fail for flat surfaces (e.g., a LCD) in the regions furthest from the corners where the tensioning bands are anchored. For example, small buckling points on the frame can be created, leading to voids in the seal, or manufacturing tolerances can lead to small voids in the seal between the two surfaces.

Figure 5:
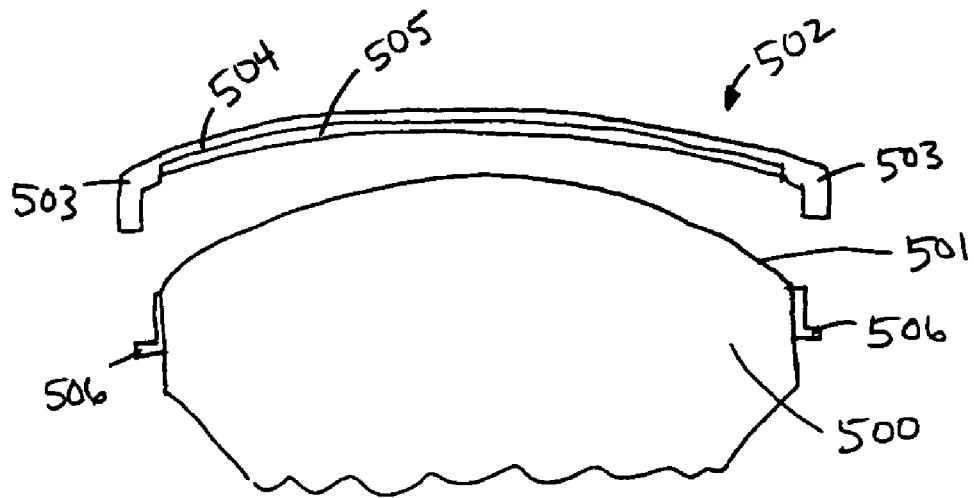
FIG. 5 is a cross-sectional view of a bezel assembly before installation into a touchscreen system having a curved surface of the prior art.
Figure 6:
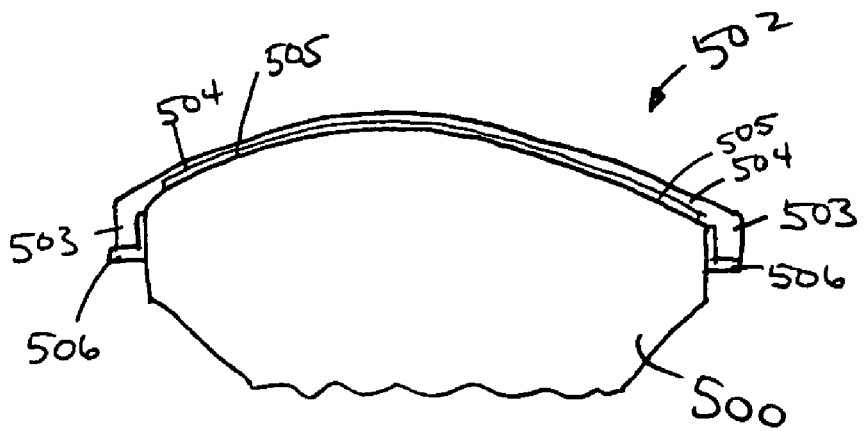
FIG. 6 is a cross-sectional view of the bezel assembly of FIG. 5 after installation into a touchscreen system.

Touchscreen system 1787C, sold by Elo TouchSystems, Inc., includes a curved bezel assembly for use with a rectangular CRT screen having a curved display surface. This bezel assembly has a rectangular opening corresponding to the CRT screen. FIG. 5 shows a cross-sectional view of touchscreen system 1787C along one of the sides of the rectangle, before assembly. CRT display device 500 has curved exterior display surface 501 and bezel assembly 502 has a rigid portion 503, a flexible portion 504 and a sealing portion 505. Bezel assembly 502 has a profile curved in the same direction as the curved surface 501 of CRT 300, but the radius of curvature for the bezel assembly 502 is slightly larger than that of the display surface 501 of CRT 500. Sealing portion 505 is provided on the interior side of the flexible portion 504 facing CRT surface 501. FIG. 6 shows a cross-sectional view of touchscreen system 1787C with bezel assembly 502 installed onto CRT 500 and mounted by attaching rigid portions 503 to mounting brackets 506. When installed, flexible portion 504 is stretched to accommodate the smaller radius of curvature of CRT surface 501, causing pressure to be exerted on surface 501 via sealing portion 505. Recesses (not shown) can be made in bezel assembly 503 in corner regions to accommodate touch sensing mechanisms, etc. Although an environmental seal is provided by the method employed by the 1787C touchscreen system, it is applicable only to sealing a curved display surface, as it relies on curved flexible portion 504 stretching over curved surface 501 to form the seal.

The present invention overcomes the problems associated with the prior sealing systems for flat (i.e. planar) surfaces through the use of a seal coupled to a bezel. The bezel's sealing area is pre-stressed so that when the bezel is assembled with a planar touchscreen, uniform pressure is applied between the seal and the touchscreen surface.

Figure 7:
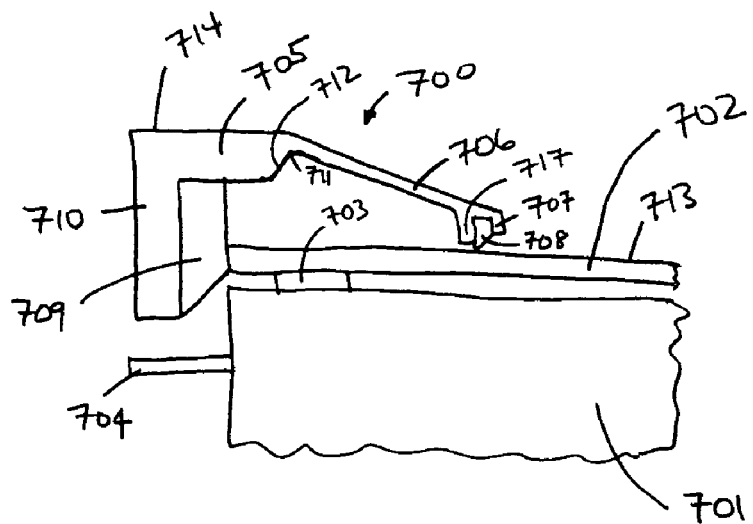
FIG. 7 is a cross-sectional view of an embodiment of a bezel assembly for a touchscreen system of the present invention, taken prior to assembly of the touchscreen system.

FIG. 7 illustrates a cross-sectional view of an embodiment of a frame (i.e., bezel assembly) having a sealing system for use with touchcreen systems of the present invention. In FIG. 7, the bezel is shown before it has been assembled into a touchscreen system. Frame 700 includes a rigid portion 705, a flexible portion 706, a mounting portion 710 and positioning rib 709. Flexible portion 706 extends from rigid portion 705 and is directed out of a plane defined by a top surface 714 of rigid portion 706, toward touchscreen 702 (e.g., flexible portion 706 is angled away from rigid portion 705). Rigid portion 705 can have generally any shape to improve function or appearance of the bezel, e.g., for the embodiment shown in FIG. 7, rigid portion 705 is approximately parallel to planar touchscreen 702. Internal (i.e., facing the touchscreen) corner 711 demarcates the transition between rigid portion 705 and flexible portion 706 and there is an internal inflection point 712 between rigid portion 705 and flexible portion 706. Attached to the end of flexible portion 706 opposed to rigid portion 705 is sealing portion 708 held in place by mounting members 707, 717. Preferably mounting member 717 closest to rigid member 705 extends further towards the touchscreen than mounting member 707. Sealing portion 708 extends beyond both mounting members 707, 717. When the bezel assembly 700 is installed into a touchscreen system, the sealing portion 708 contacts and seals to top surface 713 of touchscreen 702, and mounting member 717 acts as a hard-stop for flexible portion 706 against touchscreen 702. The bezel assembly 700 can be installed into the touchscreen system by any suitable method, e.g., by attachment to the display device, the touchscreen, or an external housing or mounting bracket. The bezel assembly preferably includes a mounting portion 710 extending in a non-planar direction (e.g., substantially perpendicular) to rigid portion 705 to impart increased stiffness to the outer periphery of bezel assembly 700. For the embodiment shown in FIG. 7, the mounting portion 710 of sealing system 700 can be attached to display 701 via mounting bracket 704. For the embodiment shown in FIG. 7, touchscreen 702 is attached to display 701 by attachment member 703, which may comprise hook and loop material, an adhesive, or the like. Alternatively, touchscreen 702 can be integral with the display device.

Figure 8:
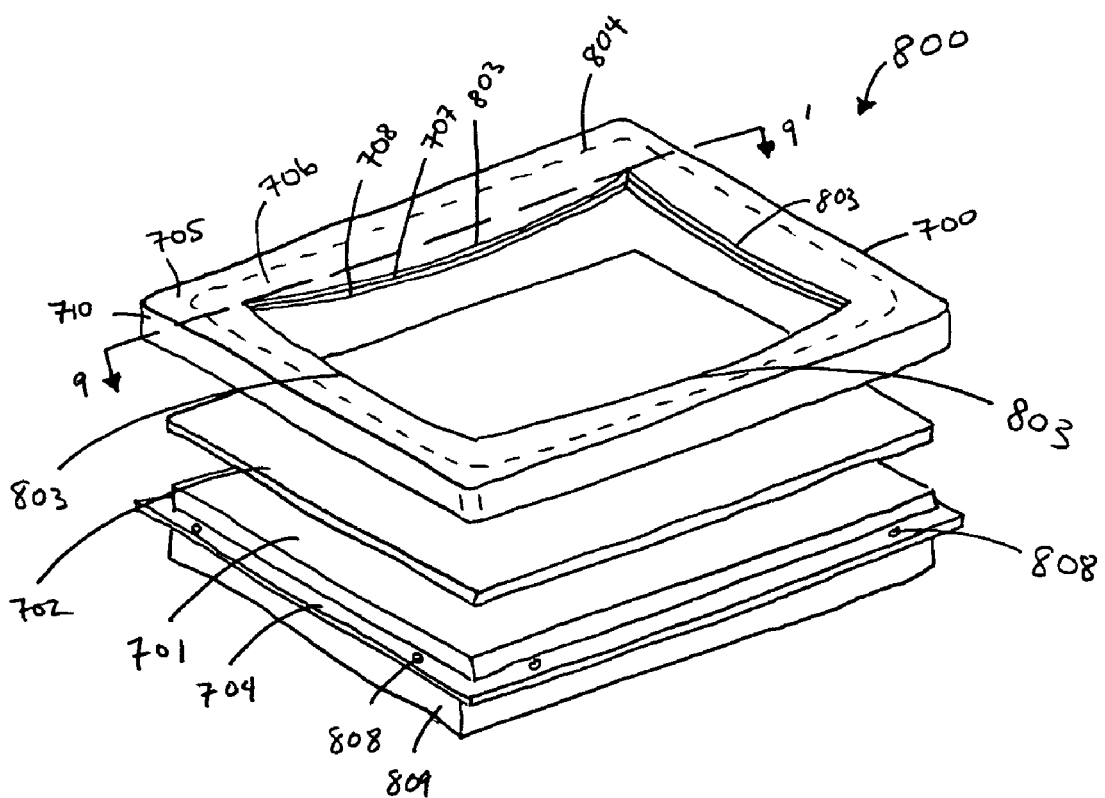
FIG. 8 is an exploded perspective view of a touchscreen system of the present invention, before the bezel assembly has been installed.
Figure 9:
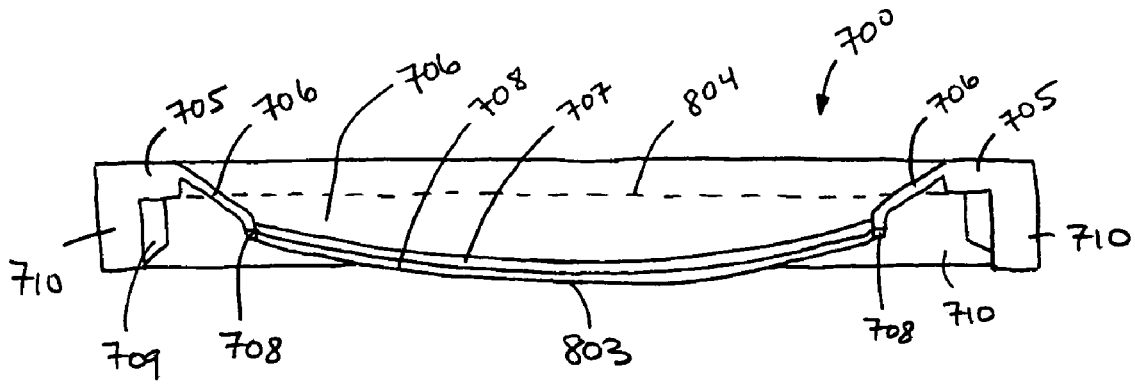
FIG. 9 is a cross-sectional view of the bezel assembly for a touchscreen system of the present invention, taken along line 9-9' of FIG. 8.

FIG. 8 illustrates an exploded view of an embodiment of a touchscreen system of the present invention. Touchscreen system 800 is shown prior to assembly and includes a bezel assembly 700. Display 701 (which can be any type of display having a flat surface, e.g., LCD, CRT, plasma, electroluminescent, etc.) includes mounting bracket 704 having mounting holes 808 and back housing 809 that can enclose electronics such as control electronics for the touchscreen system. Planar touchscreen 702 is placed over the front of display 701. Bezel assembly 700 is positioned over touchscreen 702. Bezel assembly 700 includes a rigid portion 705 and a flexible portion 706, where dashed line 804 indicates the transition between the rigid and flexible portions. Bezel assembly 700 also includes sealing portion 708 which will make contact with touchscreen 702 when the touchscreen system is assembled, and mounting portion 710 which can be attach to display 701 via mounting bracket 704 when assembled. For the embodiment shown in FIGS. 8 and 9 in which bezel assembly 700 has a rectangular central opening, the bezel assembly 700 is pre-stressed such that flexible portion 706 extends toward the central opening and downward from rigid portion 705 toward touchscreen 702 and also has a curved profile along each side of the central opening toward touchscreen 702, with the center of curvature (i.e., lowest point) along each side indicated by point 803 near a midpoint of each side. FIG. 9 shows a cross-sectional view of the bezel assembly 700 along line 9-9' of FIG. 8.

Figure 10:
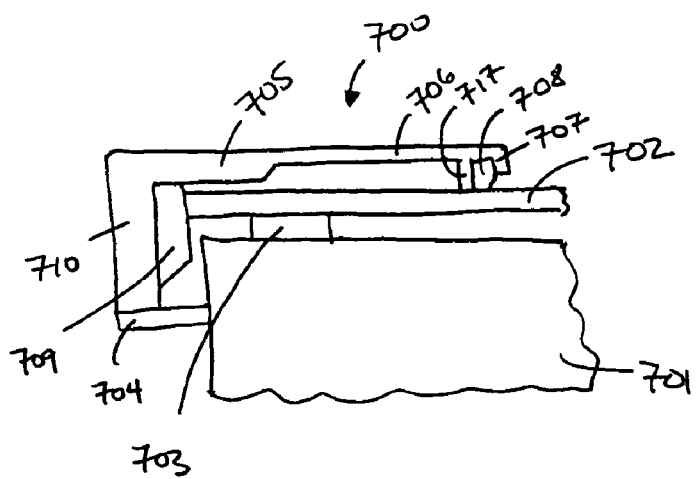
FIG. 10 is a cross-sectional view of an assembled touchscreen system of the present invention.
Figure 11:
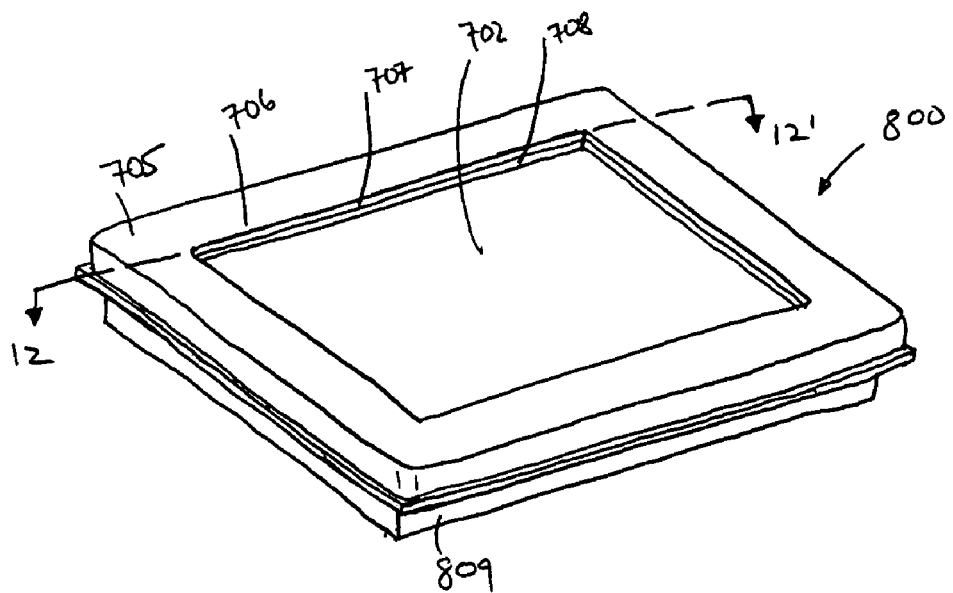
FIG. 11 is a perspective view of an assembled touchscreen system of the present invention.

FIG. 10 shows a cross-sectional view of bezel assembly 700 including the sealing system of the present invention as it is when installed into a touchscreen system. Sealing portion 708 of bezel 700 is held in place by mounting members 707, 717 and is in contact with touchscreen 702 to form a seal therewith. Flexible portion 706 has been displaced upward, and since it is a pre-stressed resilient member, its displacement results in force exerted onto touchscreen 702 through sealing portion 708. Mounting member 717 acts as a hard-stop for flexible portion 706 in the installation of bezel assembly 700 into a touchscreen system. The amount of displacement experienced by flexible portion 706 will depend on several variables, such as materials used, size of touchscreen, and type of touchscreen technology. For the embodiment shown in FIG. 10, the displacement of flexible portion 706 is such that it is approximately parallel with touchscreen 702 and rigid portion 705 after bezel assembly 700 is installed into touchscreen system 800. When assembled, mounting portion 710 of bezel 700 can be attached to mounting bracket 704 of display 701 by any suitable mechanism, e.g., bolts, threaded screws, clamps, adhesives, snaps, or the like. Positioning ribs 709 function to position touchscreen 702, and in the embodiment shown in FIG. 10, they abut touchscreen 702. FIG. 11 illustrates a touchscreen system 800 as assembled.

Figure 12:
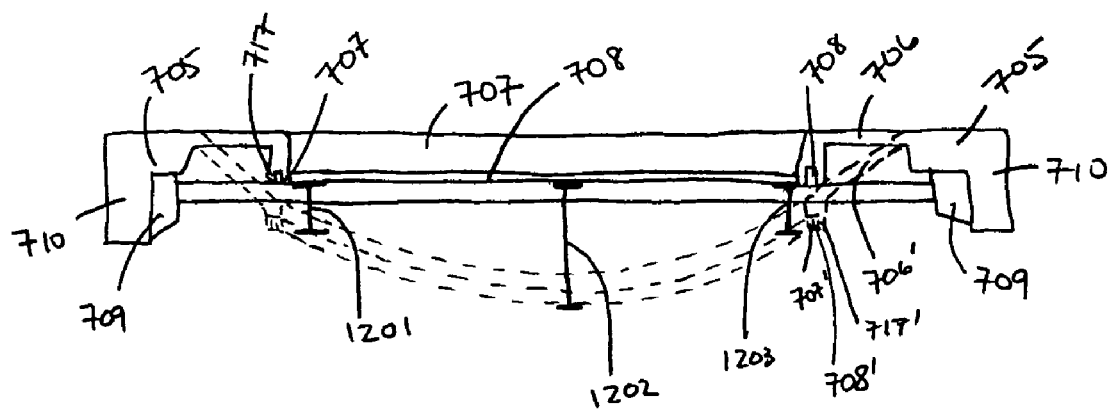
FIG. 12 is a cross-sectional view of an assembled touchscreen system of the present invention, taken along line 12-12' in FIG. 11.

FIG. 12 illustrates a cross-sectional view along line 12-12' of the assembled touchscreen system 800 shown in FIG. 11 (display device 701, mounting brackets 704 and housing 809 have been excluded from FIG. 12 for purposes of clarity). The flexible portion 706', mounting members 707', 717', and sealing portion 708' are shown in dashed lines as they were prior to assembly (see FIG. 9). The displacement of flexible portion 706 upon assembly (indicated by bars 1201, 1202, 1203) provides tension on touchscreen 702 through sealing member 708 to complete the seal. The tension of flexible portion 706 along the length of each side of the bezel provides an effective seal around the entire perimeter of the bezel. The curvature of flexible portion 706 along each side results in varying displacement of the flexible portion 706 along each side as it is assembled, with the maximum displacement occurring near the center of curvature (i.e., the center of the sides as indicated by bar 1202) and the displacement decreasing monotonically away from the center of the sides towards the corners (indicated by bars 1201 and 1203). Therefore, the tension on sealing member 708 increases monotonically toward the center of the sides and is therefore automatically compensated for increased distance away from the corners, resulting in an environmental seal for planar surfaces with substantially uniform tension around the perimeter of the seal, even at the centermost portions of the sides.

Figure 13:
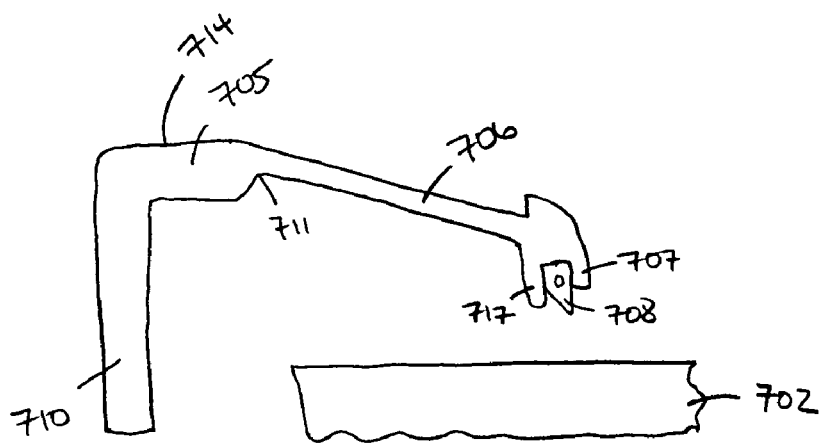
FIG. 13 is a cross-sectional view of an embodiment of a bezel assembly for a touchscreen system of the present invention.
Figure 14:
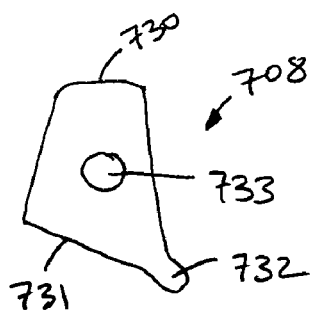
FIG. 14 is an enlarged cross-sectional view of the sealing portion of the bezel assembly shown in FIG. 13.

FIG. 13 illustrates a cross-sectional view of an embodiment of bezel assembly 700 before installation into a touchscreen system. Inner mounting member 717 that extends beyond mounting member 707 will function as a hard-stop for flexible portion 706 after it is assembled onto a flat touchscreen surface. Preferably inner mounting member 717 is rounded where it will come into contact with the touchscreen surface. FIG. 14 illustrates a cross sectional view of an embodiment of sealing portion 708 before installation into a touchscreen system. For the embodiment shown, edge 730 that will face away from the touchscreen has a narrower cross-sectional dimension than edge 731 that will face the touchscreen. In addition, finger 732 extends from edge 731, and finger 732 will make initial contact with the touchscreen upon installation. Sealing portion 708 also preferably includes inner hollow region 733, which can have any suitable cross-sectional shape, e.g., circular.

Figure 15:
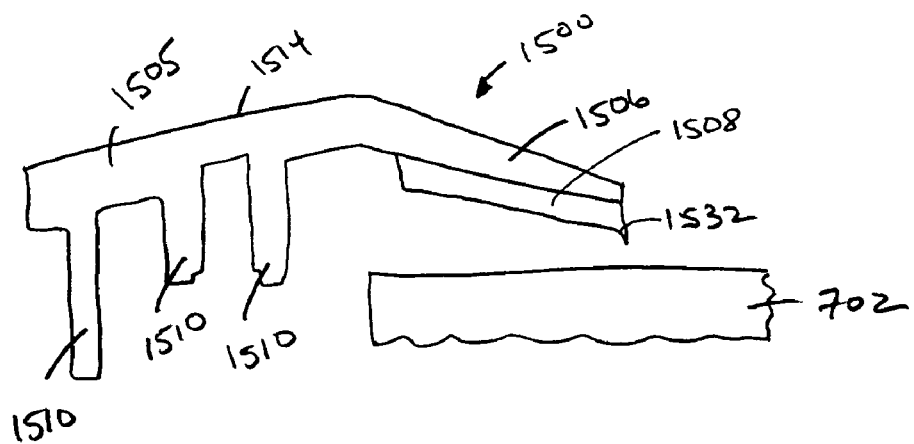
FIG. 15 is a cross-sectional view of an alternate embodiment of a bezel assembly for a touchscreen system of the present invention.

FIG. 15 illustrates an alternate embodiment of a bezel assembly 1500 that can be used with the present invention. For this embodiment, rigid portion 1505 includes mounting portions 1510 distributed along its width. Rigid portion 1505 is not generally parallel to the planar surface of touchscreen 702, but flexible portion 1506 is directed out of a plane defined by a top surface 1514 of rigid portion 1505 toward touchscreen 702. Flexible portion 1506 is tapered as it extends towards touchscreen 702. Adjacent to the internal side of flexible portion 1506 is sealing portion 1508 that has downward-pointing tip 1532. Sealing portion 1508 can be co-molded with rigid portion 1505 and flexible portion 1506.

The bezel assembly (e.g., bezel assembly 700 or 1500) is preferably formed by shaping plastic, e.g., by molding from a plastic, extruding a plastic material, thermo-forming a plastic, machining, solution-casting, or any other suitable means. The plastic can be a thermoplastic, thermoset, or any other suitable plastic. The plastic should be flexible, yet resilient, so that it can exert pressure on the touchscreen to form the seal. For example, an ABS (Acryonitrile Butadiene Styrene)/polycarbonate blend can be molded to make bezel assemblies of the present invention. In the case of IR touchscreens, a plastic that is substantially transparent to the infrared light being used (i.e., light that is transmitted across the screen and detected) in the touch sensor must be chosen, e.g., a polyurethane. Preferably, all sections of bezel assembly excluding sealing portion (e.g., for the embodiment shown in FIGS. 7-13, the mounting portion 710, rib 709, rigid portion 705, flexible portion 706, and mounting members 707, 717, and for the embodiment shown in FIG. 15, rigid portion 1505, flexible portion 1506, mounting portions 1510) are all made from the same material and shaped simultaneously (e.g., molded) to form a bezel assembly. The sealing portion (e.g, 708, 1508) can be made from any suitable sealing material, e.g., a soft thermoplastic or rubber, such as TPU (thermoplastic urethane). The sealing portion can be simultaneously shaped (e.g., co-molded) with the rest of the bezel assembly. Alternatively, the sealing portion can be applied following forming of the rest of the bezel, e.g., by inserting into mounting members 707, 717.

Although the embodiments shown in FIGS. 7-15 illustrate bezel assemblies having rectangular shapes and openings, the present invention can be equally well used for bezel assemblies having non-rectangular shapes or openings, e.g., circular, oval, hexagonal, diamond-shaped, or any other desired shape.

The relative size of rigid portion 705, 1505 to that of flexible portion 706, 1506 will depend on the size the touchscreen, the material used for the bezel, and the type of touchscreen used. For example, in some embodiments it is desired that flexible portion 706, 1506 having a width (the flexible portion's width being the dimension extending from the rigid portion to the inner periphery of the frame) at least equal to the width of rigid portion 705, 1505 (the rigid portion's width being the dimension extending from the outer periphery of the frame to the beginning of the flexible portion). In other embodiments, it is preferred that the width of the flexible portion be at least 50% greater than the width of the rigid portion. The invention is illustrated by the following two examples that show particular materials and dimensions for a bezel assembly to be used with a touchscreen system of the present invention. The practice of this invention can be further understood by reference to the following examples, which are provided by way of illustration and not of limitation.

EXAMPLE 1

A bezel assembly for use with the present invention is provided for a flat 12" display having a standard 3-4 width-length aspect ratio for a touchscreen system by molding using a standard ABS or ABS/polycarbonate blend, preferably flame retardant, (e.g., ABS FR AF-312T available from LG Chemical, or PC/ABS alloy GN-5008, available from LG Chemical, or PC+ABS FR 2000, available from Bayer), using the manufacturer's standard instructions for molding conditions. The cross-section of the bezel assembly is shown in FIG. 15. The flexible portion is approximately 1.9 mm thick where it meets the rigid portion, is tapered to about 1 mm thick at its innermost edge, and extends about 10.7 mm from rigid portion to its innermost edge. The rigid portion can be any dimension suitable for the desired touchscreen appearance, weight, etc. The rigid portion has mounting members as shown in FIG. 15 as elements 1510, as they impart more rigidity to the periphery of the bezel assembly and enable mounting to the display. The bezel assembly is pre-stressed during molding so that the flexible portion is curved toward the planar touchscreen along the length of the sides as illustrated in FIGS. 8 and 9. The sealing portion has thickness of about 0.9 mm, is made from TPU (thermoplastic urethane) and is co-molded with the rest of the bezel assembly. The sealing portion has a tip extending approximately 0.5 mm toward the touchscreen (shown as element 1532 in FIG. 15). The curvature of the flexible portion is formed such that when the bezel assembly is installed against a flat 12" flat display, the flexible portion is displaced approximately 0.4 mm at the corners (corresponding to bars 1201 and 1203 in FIG. 12), and about 1.0 mm at the center of all four sides (corresponding to bar 1202 in FIG. 12).

EXAMPLE 2

A bezel assembly for a flat 19" display to be used with a touchscreen system of the present invention is provided. Cross-sectional views of the bezel assembly are shown in FIGS. 7-13. The bezel is formed by molding using a standard ABS or ABS/polycarbonate blend, preferably flame retardant (e.g., ABS FR AF-312T available from LG Chemical, or PC/ABS alloy GN-5008, available from LG Chemical, or PC+ABS FR 2000, available from Bayer), using the manufacturer's standard instructions for molding conditions. The flexible portion is approximately 1.5 mm thick and 21 mm long (extending from the rigid portion to the end of mounting member 507 as shown in FIG. 13), and the rigid portion can be any dimension suitable for the desired touchscreen appearance, weight, etc. The rigid portion has mounting members 710 as shown in FIGS. 7-13, as it imparts more rigidity to the periphery of the bezel assembly and enables mounting the bezel to the display. The bezel assembly is pre-stressed during molding so that the flexible portion is curved toward the touchscreen along the length of the sides (see FIGS. 8 and 9). Mounting members 707, 717 are spaced apart by about 1.3 mm, and the sealing portion has a cross-section as illustrated in FIG. 14, with cross-sectional widths at the top of about 1.3 mm and at the base of about 1.8 mm. The interior hole has a diameter of about 0.6 mm. The sealing portion has a finger section extending from the main body by about 0.5 mm. The sealing portion is extruded as a strip and is made from silicone rubber, e.g., Compound S7309-80, available from Hannifin Corp. The curvature of the flexible portion is formed such that when the bezel is installed against a flat 19" flat display, the flexible portion is displaced approximately 0.4 mm at the corners (corresponding to bars 1201 and 1203 in FIG. 12), and about 1.5 mm at the center of all four sides (corresponding to bar 1202 in FIG. 12).

The foregoing detailed description of the invention includes passages that are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extend appropriate, in the context of another figure, in combination with another feature, or in the invention in general.

It will be understood that the above-described arrangements of apparatus are merely illustrative of applications of the principles of this invention and many other embodiments and modifications may be made without departing from the spirit and scope of the invention as defined in the claims.

What is claimed is:

1. A touchscreen system comprising:
    a planar touchscreen coupled to a display device having a planar display surface, the touchscreen comprising a touch sensitive region on a planar touchscreen surface;
    a frame positioned above the touchscreen, the frame comprising:

a central opening that substantially provides an outer border for the touch sensitive region, is generally rectangular, and comprises four interior sides and four interior corners;

a rigid portion comprising an outer periphery of the frame and having a top surface defining a first plane;

a flexible portion connected to the rigid portion, the flexible portion comprising an inner periphery of the frame and comprising a curved profile along each interior side, the profile being curved toward the touchscreen and comprising a center of curvature near a midpoint of each interior side; and a sealing portion interposed between the touchscreen surface and the flexible portion, the sealing portion having been simultaneously shaped with the rigid portion and the flexible portion;

the flexible portion of the frame being:

directed out of the first plane toward the touchscreen prior to bringing the frame in contact with the touchscreen; and displaced after bringing the frame in contact with the touchscreen and installing the frame into the touchscreen system such that flexible portion exerts pressure on the touchscreen surface through the sealing portion.

2. The touchscreen system of claim 1, wherein installing the frame into the touchscreen comprises mounting the frame to the display device.

3. The touchscreen system of claim 1, wherein the flexible portion is displaced such that it becomes generally parallel to the touchscreen after installing the frame.

4. The touchscreen system of claim 1, wherein the pressure exerted on the touchscreen surface by the flexible portion is substantially uniform around the inner periphery of the frame.

5. The touchscreen system of claim 1, wherein the frame is formed by shaping a plastic material.

6. The touchscreen system of claim 1, wherein the flexible portion is integral with the rigid portion.

7. The touchscreen system of claim 1, wherein the sealing portion comprises a rubber or soft thermoplastic.

8. The touchscreen system of claim 1, wherein displacement of the flexible portion at the center of curvature when the frame is installed is at least twice the displacement at an interior corner of the opening.

9. The touchscreen system of claim 1, wherein displacement of the flexible portion at the center of curvature when the frame is installed is at least three times the displacement at an interior corner of the opening.

10. The touchscreen system of claim 1, wherein the flexible portion has a thickness that is less than or equal to one half the thickness of the rigid portion.

11. The touchscreen system of claim 1, wherein the flexible portion is tapered.

12. The touchscreen system of claim 1, wherein:

the flexible portion has a width extending from the rigid portion to the inner periphery of the frame;

the rigid portion has a width extending from the outer periphery of the frame to the flexible portion; and the width of the flexible portion is at least equal to the width of the rigid portion.

13. The touchscreen system of claim 1, the frame further comprising a mounting portion connected to the rigid portion, the mounting portion being non-planar with the rigid portion.

14. The touchscreen system of claim 13, wherein the mounting portion is connected to the display device.

15. The touchscreen system of claim 1, wherein the touchscreen comprises a touch sensing mechanism positioned on a periphery of the touchscreen, and the frame encloses and forms a seal around the touch sensing mechanism.

16. The touchscreen system of claim 1, wherein the touchscreen comprises an acoustic touchscreen.

17. The touchscreen system of claim 1, wherein the touchscreen comprises an infrared touchscreen.

18. The touchscreen system of claim 17, wherein the frame comprises a material substantially transparent to infrared light used in the infrared touchscreen.

19. touchscreen system of claim 1, wherein the touchscreen comprises a resistive or capacitive touchscreen.

20. The touchscreen system of claim 1, wherein the display device comprises a cathode ray tube or a liquid crystal display.

21. touchscreen system of claim 1, wherein the touchscreen is integral with the display device.

22. A method for assembling a touchscreen system, comprising:

providing a planar touchscreen comprising a planar touch sensitive region on a planar touchscreen surface;

coupling the touchscreen to a display device having a planar display surface;

providing a frame comprising:

a central opening which is substantially rectangular, and comprises four interior sides and four interior corners;

a rigid portion comprising an outer periphery of the frame, the rigid portion having a top surface defining a first plane;

a flexible portion connected to the rigid portion, the flexible portion (a) comprising an inner periphery of the frame, (b) comprising a curved profile along each interior side, the profile being curved toward the touchscreen and comprising a center of curvature near a midpoint of each interior side, and (c) being directed out of the first plane; and a sealing portion disposed on an inner periphery of the flexible portion, the sealing portion having been simultaneously shaped with the rigid portion and the flexible portion;

positioning the frame above the touchscreen such that the flexible portion is directed toward the touchscreen and the opening substantially provides an outer border for the touch sensitive region; and installing the frame such that sealing portion contacts the touchscreen surface and the flexible portion is displaced toward the first plane such that it exerts pressure on the touchscreen through the sealing portion.

23. The method of claim 22, wherein the pressure exerted by the flexible portion on the touchscreen surface is substantially uniform around the inner periphery of the frame.

24. The method of claim 22, wherein the installing of the frame comprises attaching the frame to the display device.

25. The method of claim 22, wherein displacement of the flexible portion at the center of curvature when the frame is mounted to the display is at least twice the displacement at an interior corner.

26. The method of claim 22, wherein displacement of the flexible portion at the center of curvature when the frame is mounted to the display is at least three times the displacement at an interior corner.

27. The method of claim 22, wherein the touchscreen comprises a touch sensing mechanism positioned around a periphery of the touchscreen, and the frame is installed to enclose and form a seal around the touch sensing mechanism.

28. The method of claim 22, wherein the touchscreen comprises an acoustic touchscreen.

29. The method of claim 28, wherein the pressure exerted by the sealing portion on the touchscreen is adjusted to optimize the transmission of acoustic waves across the touchscreen surface.

30. A frame for use in sealing a touchscreen system having a touchscreen with a planar exterior surface, the frame being positioned over the exterior surface and comprising:
   a central opening that is substantially centered around a touch sensitive region on the exterior surface;
   a rigid portion comprising an outer periphery of the frame and having a top surface defining a first plane;
   a flexible portion connected to the rigid portion, the flexible portion comprising an inner periphery of the frame; and
   a sealing portion interposed between the exterior surface and the flexible portion, the sealing portion having been simultaneously shaped with the rigid portion and the flexible portion;
   the flexible portion of the frame being:
      directed out of the first plane toward the exterior surface prior to bringing the frame into contact with the exterior surface; and
      displaced after bringing the frame into contact with the exterior surface and installing the frame into the touchscreen system such that flexible portion exerts pressure on the exterior surface through the sealing portion.

31. The frame of claim 30, further comprising a sealed interior recess comprising a touch sensing mechanism of the touchscreen system.

* * * * *